L. BERTRAND.
MOWING MACHINE.
APPLICATION FILED MAY 22, 1913.
1,155,988. Patented Oct. 5, 1915.
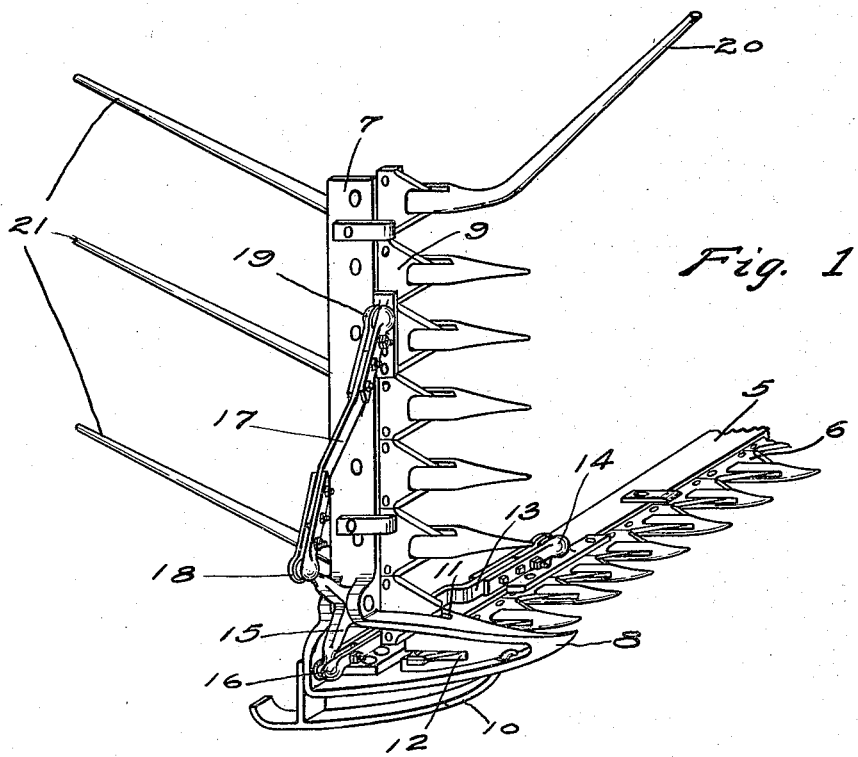
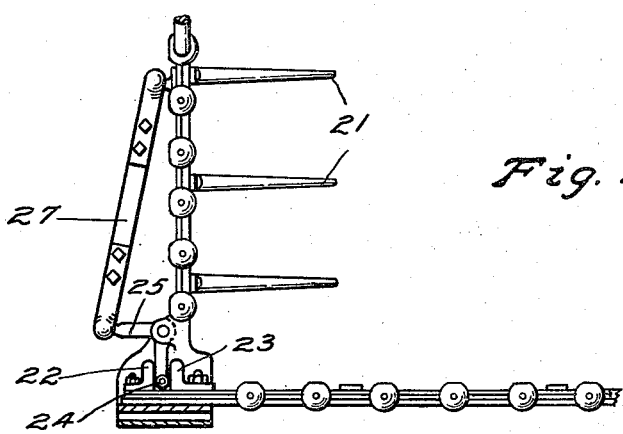
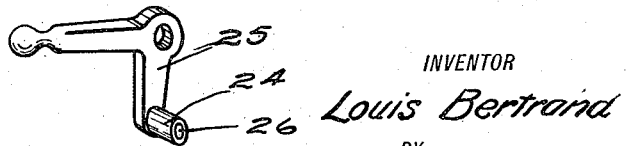
WITNESSES:
O. Johnson
F. C. Matheny
INVENTOR
Louis Bertrand
BY
C. D. Haskins
ATTORNEY

UNITED STATES PATENT OFFICE.

LOUIS BERTRAND, OF SEATTLE, WASHINGTON.

MOWING-MACHINE.

1,155,988. Specification of Letters Patent. Patented Oct. 5, 1915.

Application filed May 22, 1913. Serial No. 769,253.

*To all whom it may concern:*

Be it known that I, LOUIS BERTRAND, citizen of the United States, residing at Seattle, in the county of King and State of Washington, have invented a certain new and useful Improvement in Mowing-Machines, of which the following is a specification.

My invention relates to improvements in mowing machines in which a vertically reciprocating sickle adapted to operate in conjunction with the main horizontal sickle is disposed to extend upwardly from the outer end of the main horizontal sickle bar, and the objects of my improvements are, to provide a device of this class that will operate without clogging, and that will overcome side draft in the machine when cutting tangled or lodged grass; to provide means for reducing friction between moving parts and for compensating for wear in the mechanisms that communicate reciprocating motion from the horizontal main sickle to the vertical auxiliary sickle and to provide a vertical sickle bar, having an integral bottom shoe, which vertical sickle bar may be quickly and easily attached to the main sickle bar of any ordinary type of mowing machine.

A further object of my invention is to provide alternative means whereby reciprocating motion may be communicated from the horizontal to the vertical sickle without the use of one or both of the connecting rods commonly used in such devices.

I attain these objects by devices illustrated in the accompanying drawings, wherein—

Figure 1 is a view in perspective of a device embodying my invention, Fig. 2 is a view in front elevation of a device embodying a modified form of my invention and Fig. 3, is a view in perspective of a detail of my invention.

In the drawings, wherein like reference numerals indicate like parts, 5 is a fragmentary portion of the horizontal sickle bar of an ordinary mowing machine which carries a sickle 6 adapted to reciprocate in the usual manner. An auxiliary vertical sickle bar 7 provided with an integral shoe 8 and adapted to carry a vertically reciprocating sickle 9 is attached to the outer end of the horizontal sickle bar.

The shoe 8 is provided with a runner 10 adapted to slide over the ground and is further provided with a slot 11 on its top side and a slot 12 on its inner side through which slots the end cutting knives of the sickles 9 and 6 respectively, reciprocate.

A connecting rod 13 having its inner end pivotally attached to the sickle 6 by means of a ball and socket joint 14 and its outer end pivotally attached by a similar ball and socket joint 16, to the lower end of a bell-crank 15 pivotally mounted on the outside surface of the upright sickle bar 7, while a similar connecting rod 17, having its lower end pivotally attached to the outwardly projecting end of the bell-crank 15 by means of a ball and socket joint 18 and its upper end pivotally attached to the upright sickle 9 by means of a ball and socket joint 19 transmits the reciprocatory motion of the connecting rod 13 to the sickle 9 thus causing said sickle 9 to reciprocate vertically to cut its way through tangled or lodged grass.

A deflecting finger 20 extending forwardly and upwardly from the top sickle guard of the vertical sickle bar 7 and made integral therewith prevents catching and holding grass and serves to draw the tall grass downwardly to the knives, while horizontal divide fingers 21, 21 are disposed to extend angularly rearward and inward to divide the cut grass from the uncut grass.

In Fig. 2, I have illustrated a modified form of my invention wherein there are substituted for the connecting rod 13, and ball and socket joints 14 and 16, two upwardly projecting lugs 22 and 23 fixedly secured to the top surface of the sickle 6 near its outer end, between which lugs a roller 24 is disposed, said roller 24 being rotatably secured to the lower arm of a bell-crank 25 by a pin 26 (as illustrated in Fig. 3).

The reciprocatory motion of the sickle 6, acting through the lugs 22 and 23 and the roller 24 is thus made to oscillate the bell-crank 25 which bell-crank 25 acting through the connecting rod 27 serves to cause the sickle 9 to reciprocate vertically.

What I claim is:

In a device of the kind described, the combination with a horizontal finger bar, of a vertical finger bar arranged at one end of the horizontal finger bar and having its lower end spaced above said horizontal bar and provided on its outer side with spaced ears, knife bars slidably mounted with respect to the respective finger bars, a bell crank lever having balls at its ends fulcrumed between said ears, ball supporting members connected to said knife bars, and offset links connecting the balls of the lever with the balls of the ball supporting members.

In witness whereof, I hereunto subscribe my name this 28th day of April, A. D. 1913.

LOUIS BERTRAND.

Witnesses:
 A. HASKINS,
 GEO. BLAIR.

Copies of this patent may be obtained for five cents each, by addressing the "Commissioner of Patents, Washington, D. C."